(12) United States Patent
Kameoka et al.

(10) Patent No.: US 8,243,224 B2
(45) Date of Patent: Aug. 14, 2012

(54) FLAT PANEL DISPLAY DEVICE HAVING A PLURALITY OF FIRST BOSSES DISPOSED ON THE REAR FACE OF A FRONT PANEL AND A BEZEL FIXEDLY COUPLED TO AN OUTER PERIPHERAL PORTION

(75) Inventors: Shinichi Kameoka, Osaka (JP); Nobuhiro Matsutani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 221 days.

(21) Appl. No.: 12/762,451

(22) Filed: Apr. 19, 2010

(65) Prior Publication Data
US 2010/0265416 A1    Oct. 21, 2010

(30) Foreign Application Priority Data
Apr. 20, 2009  (JP) .................... 2009-101713

(51) Int. Cl.
*G02F 1/1333* (2006.01)
*H04N 5/74* (2006.01)
*H04N 5/64* (2006.01)

(52) U.S. Cl. ............. 349/58; 349/56; 348/766; 348/789

(58) Field of Classification Search ............ 349/56, 349/58; 348/739, 751, 761, 766, 787, 789, 348/794
See application file for complete search history.

(56) References Cited

U.S. PATENT DOCUMENTS

| 2002/0054249 A1* | 5/2002 | Ryu et al. ............ 349/58 |
| 2002/0080297 A1* | 6/2002 | Sung ..................... 349/58 |
| 2003/0122993 A1 | 7/2003 | Eiraku et al. |
| 2005/0206794 A1 | 9/2005 | Tokuda |

FOREIGN PATENT DOCUMENTS

| EP | 2 015 131 A1 | 1/2009 |
| JP | 2007-110578 A | 4/2007 |
| WO | WO-2006/090543 A1 | 8/2006 |

OTHER PUBLICATIONS

European Search Report of corresponding EP Application No. 10 16 0452.8 dateed Aug. 25, 2010.

* cited by examiner

*Primary Examiner* — Brian M. Healy
*Assistant Examiner* — Paul Lee
(74) *Attorney, Agent, or Firm* — Global IP Counselors

(57) ABSTRACT

A flat panel display device includes a front cabinet, a rear cabinet, and a flat panel display component. The front cabinet includes a front panel, an edge portion, a plurality of contact ribs, a plurality of first bosses, and a plurality of reinforcing ribs. The contact ribs are disposed on the rear face of the front panel along side parts of the edge portion, respectively. The contact ribs have a main rib that extends parallel to a respective one of the side parts of the edge portion, and a sub rib that extends between the main rib and the respective one of the side parts of the edge portion in a direction perpendicular to the main rib. The reinforcing ribs are disposed on the rear face of the front panel. The reinforcing ribs extend between the first bosses and the main ribs of the contact ribs, respectively.

13 Claims, 7 Drawing Sheets

FLAT PANEL DISPLAY DEVICE HAVING A PLURALITY OF FIRST BOSSES DISPOSED ON THE REAR FACE OF A FRONT PANEL AND A BEZEL FIXEDLY COUPLED TO AN OUTER PERIPHERAL PORTION

CROSS-REFERENCE TO RELATED APPLICATIONS

This application claims priority to Japanese Patent Application No. 2009-101713 filed on Apr. 20, 2009. The entire disclosure of Japanese Patent Application No. 2009-101713 is hereby incorporated herein by reference.

BACKGROUND

1. Field of the Invention

The present invention generally relates to a flat panel display device. More specifically, the present invention relates to a flat panel display device having a front cabinet and a rear cabinet that is fixedly coupled to the front cabinet.

2. Background Information

A conventional flat panel display device includes a liquid crystal television set (see Japanese Laid-Open Patent Application Publication No. 2007-110578, for example). The conventional flat panel display device has a liquid crystal module, a cabinet with an opening, and a stand. The liquid crystal module is disposed inside the cabinet. The cabinet has a front cabinet and a rear cabinet. A cell face of the liquid crystal module is disposed opposite the opening formed in the front cabinet.

To give the liquid crystal television set a neat appearance, the gap between the opening and the cell face of the liquid crystal module must be even. Furthermore, when the front cabinet is fastened to the rear cabinet with screws, bending of the front cabinet occurs due to stress exerted around fastening portions of the front cabinet, which mars the appearance of the front cabinet.

SUMMARY

The present invention was conceived in light of the above-mentioned problems. One object of the present invention is to provide a flat panel display device with which a good appearance of the flat panel display device can be obtained.

In accordance with one aspect of the present invention, a flat panel display device includes a front cabinet, a rear cabinet, and a flat panel display component. The front cabinet includes a front panel, an edge portion, a plurality of contact ribs, a plurality of first bosses, and a plurality of reinforcing ribs. The front panel has a rectangular opening. The edge portion is disposed on a rear face of the front panel along the rectangular opening. The contact ribs are disposed on the rear face of the front panel along side parts of the edge portion, respectively. The contact ribs has a main rib that extends parallel to a respective one of the side parts of the edge portion, and a sub rib that extends between the main rib and the respective one of the side parts of the edge portion in a direction perpendicular to the main rib. The first bosses are disposed on the rear face of the front panel at radial outward locations relative to the main ribs of the contact ribs with respect to a center of the rectangular opening, respectively. The reinforcing ribs are disposed on the rear face of the front panel. The reinforcing ribs extend between the first bosses and the main ribs of the contact ribs, respectively. The rear cabinet is fixedly coupled to the front cabinet. The rear cabinet includes a plurality of second bosses, with the second bosses being disposed at locations corresponding to the first bosses of the front cabinet. The flat panel display component is disposed within an inside space that is defined between the front and rear cabinets.

With this flat panel display device, it is possible to provide a flat panel display device with which a good appearance of the flat panel display device can be obtained.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the preferred embodiment are provided for illustration only and not for the purpose of limiting the invention as defined by the appended claims and their equivalents.

Figure 2A:
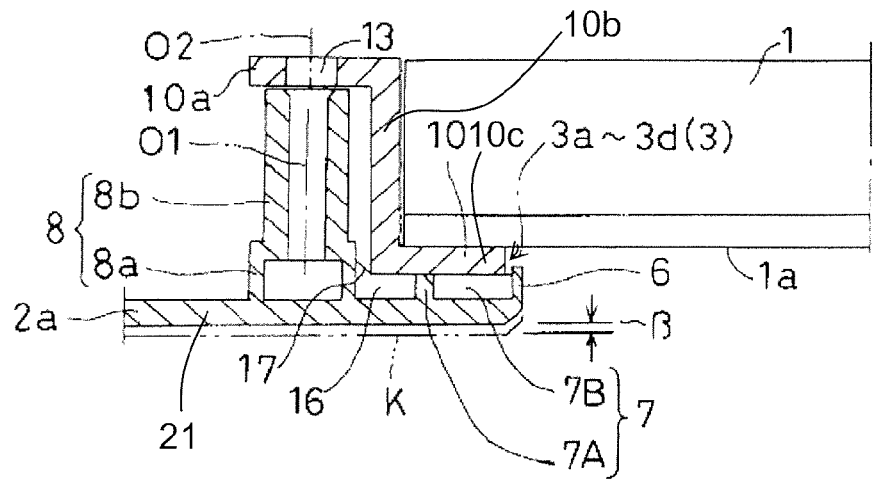
FIG. 2A is a detailed cross sectional view illustrating an assembly process of the flat panel display device.
Figure 2B:
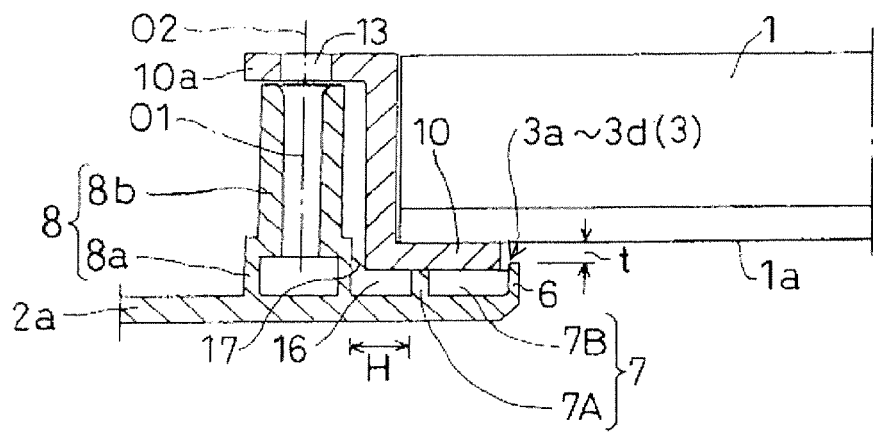
FIG. 2B is a detailed cross sectional view illustrating the assembly process of the flat panel display device.
Figure 2C:
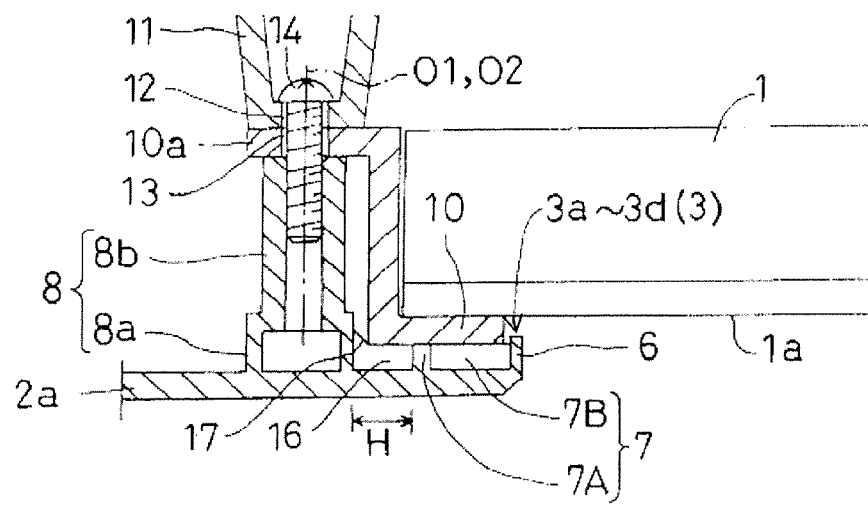
FIG. 2C is a detailed cross sectional view illustrating the assembly process of the flat panel display device.
Figure 3:
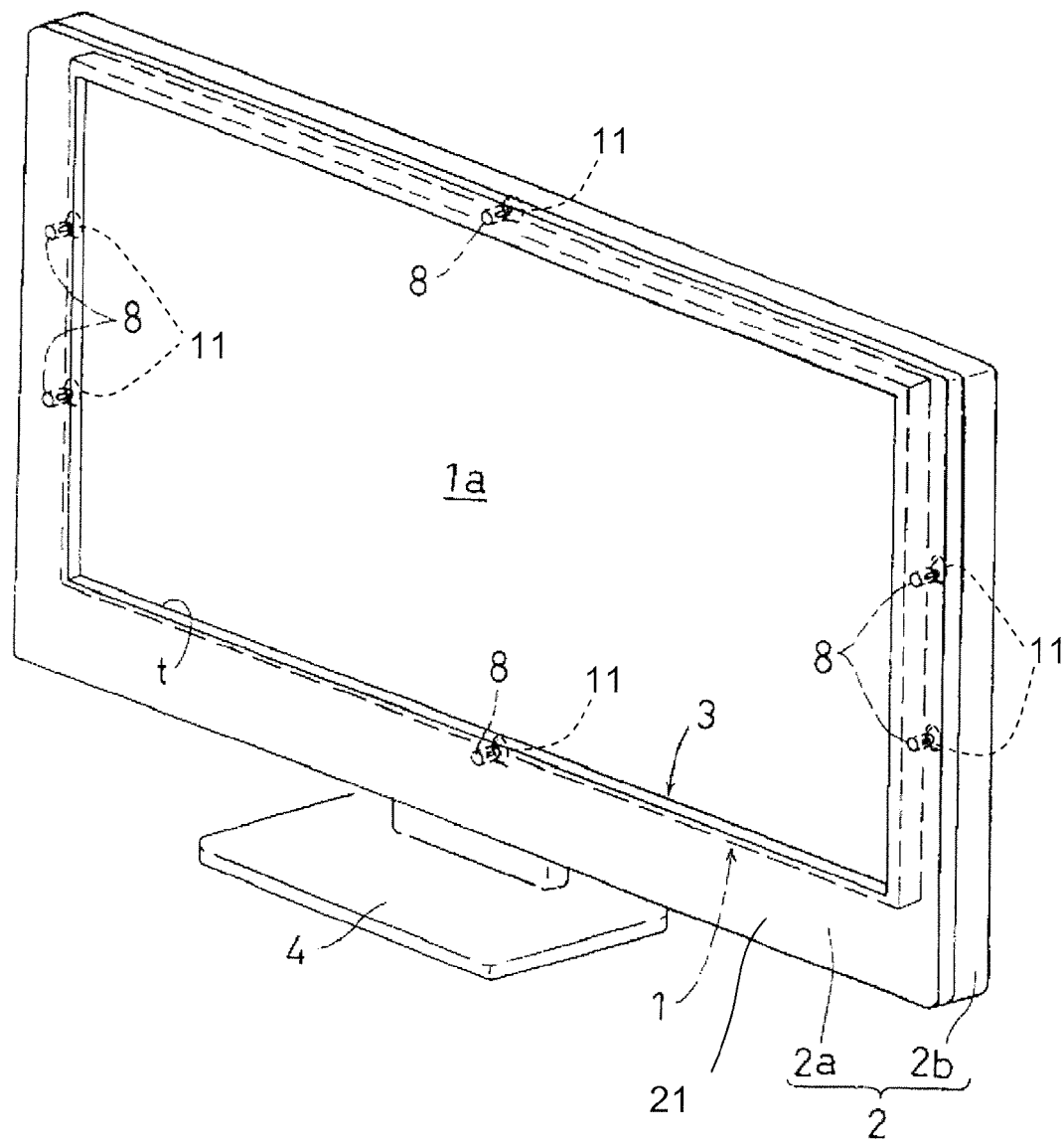
FIG. 3 is a perspective view of the flat panel display device.

FIGS. 1 to 5 illustrate a flat panel display device. The flat panel display device includes a liquid crystal television set. As shown in FIG. 3, the flat panel display device includes a liquid crystal module (e.g., flat panel display component) 1, a cabinet 2 with an opening (e.g., rectangular opening) 3, and a stand 4. The liquid crystal module 1 is disposed inside the cabinet 2. The liquid crystal module 1 exposes through the opening 3 of the cabinet 2. The cabinet 2 includes a front cabinet 2a and a rear cabinet 2b. The front and rear cabinets 2a and 2b are fitted together with a plurality of screws 14 (see FIG. 1). The front cabinet 2a has a front panel 21 with the opening 3. The liquid crystal module 1 mainly includes a liquid crystal panel (e.g., liquid crystal cell) with a cell face 1a to display image. Furthermore, the liquid crystal module 1 mainly includes a frame (not shown), a light reflecting sheet (not shown), a light source (not shown), an optical sheet (not shown), and a bezel 10 (see FIG. 1). The bezel 10 is fixedly coupled around the liquid crystal panel with the cell face 1a. The cell face 1a of the liquid crystal module 1 is disposed opposite the opening 3 formed in the front cabinet 2a. The stand 4 is fixedly coupled to the cabinet 2.

To give the flat panel display device a neat appearance, a gap t between the opening 3 and the cell face 1a of the liquid crystal module 1 need to be even.

Figure 4:
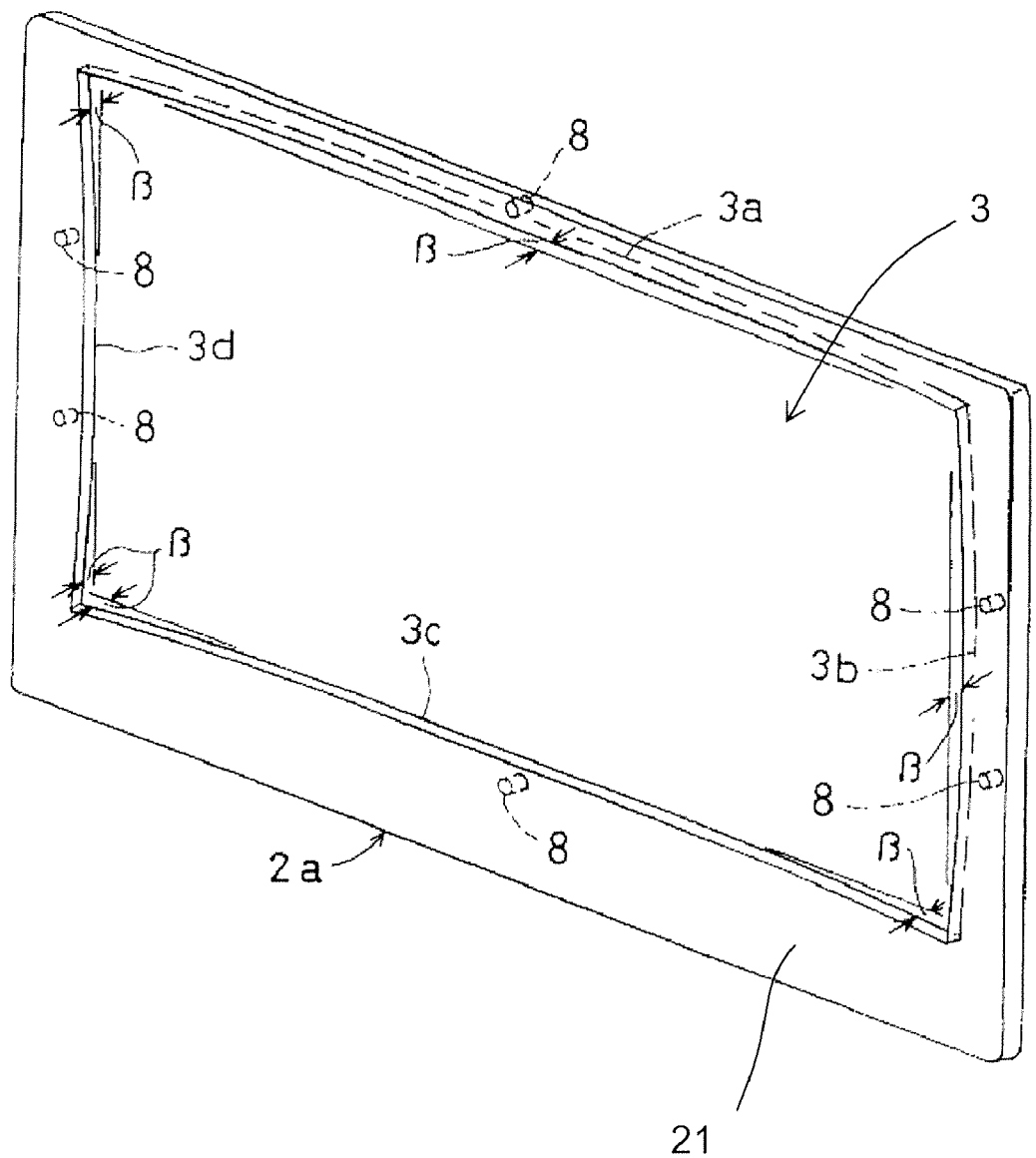
FIG. 4 is a perspective view of a front cabinet of the flat panel display device.

In view of this, as is shown in exaggerated fashion in the perspective view of the front cabinet 2a in FIG. 4, top, bottom, left, and right sides 3a to 3d of the opening 3 are curved backwards (toward a rear side of the flat panel display device) in a large radius of curvature so that center parts of the sides 3a to 3d stick out to the rear by a distance β (such as 0.1 to 0.5 mm) relative to end portions thereof (e.g., corner portions of the opening 3) (although this cannot actually be detected by eye). When the flat panel display device is assembled, the center parts of the sides 3a to 3d are pushed down by the distance β by the liquid crystal module 1, so that the sides 3a to 3d are straightened and the gap t between the opening 3 and the cell face 1a of the liquid crystal module 1 is made even.

Figure 1:
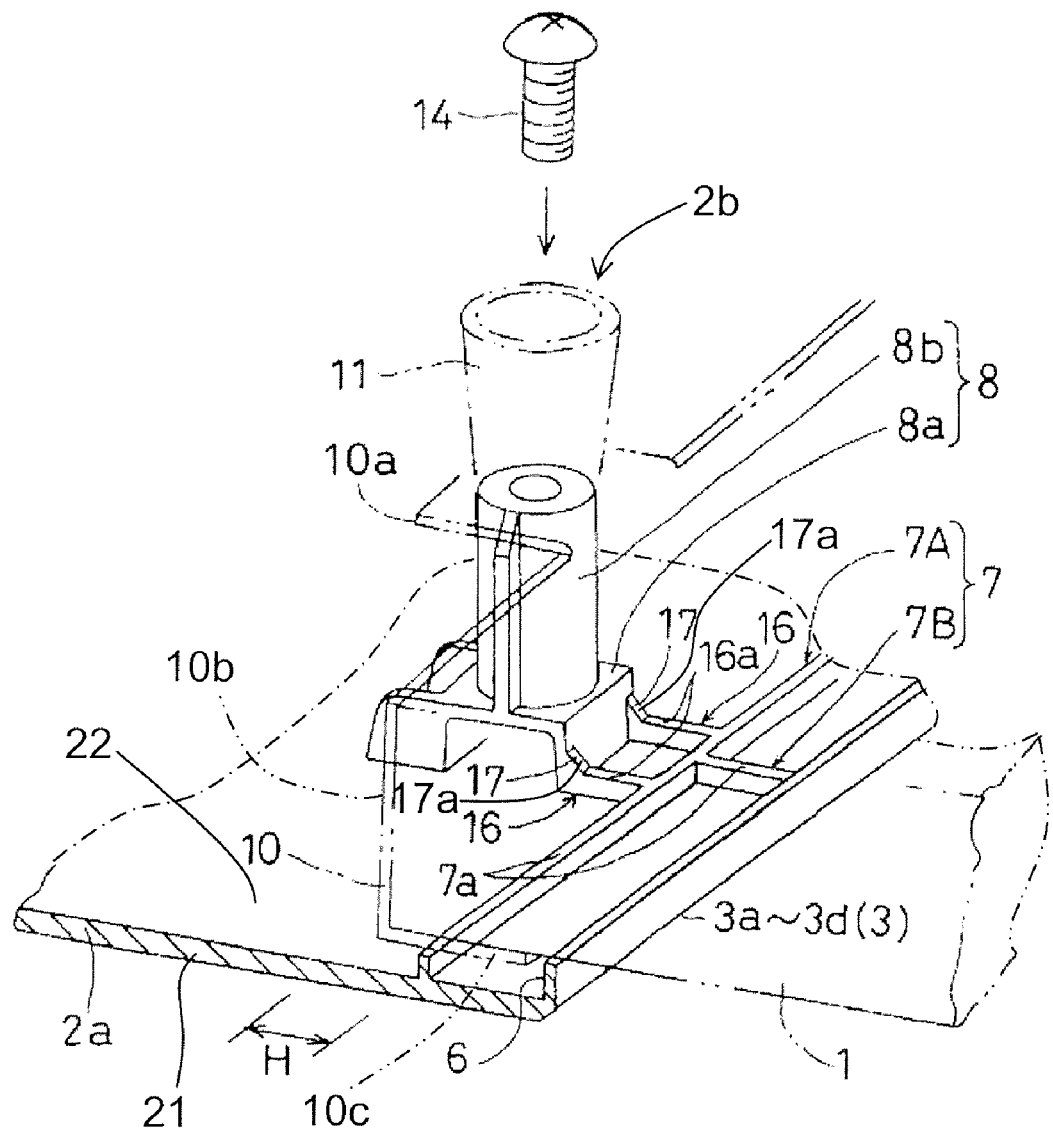
FIG. 1 is a detailed perspective view of a flat panel display device in accordance with one embodiment.
Figure 5:
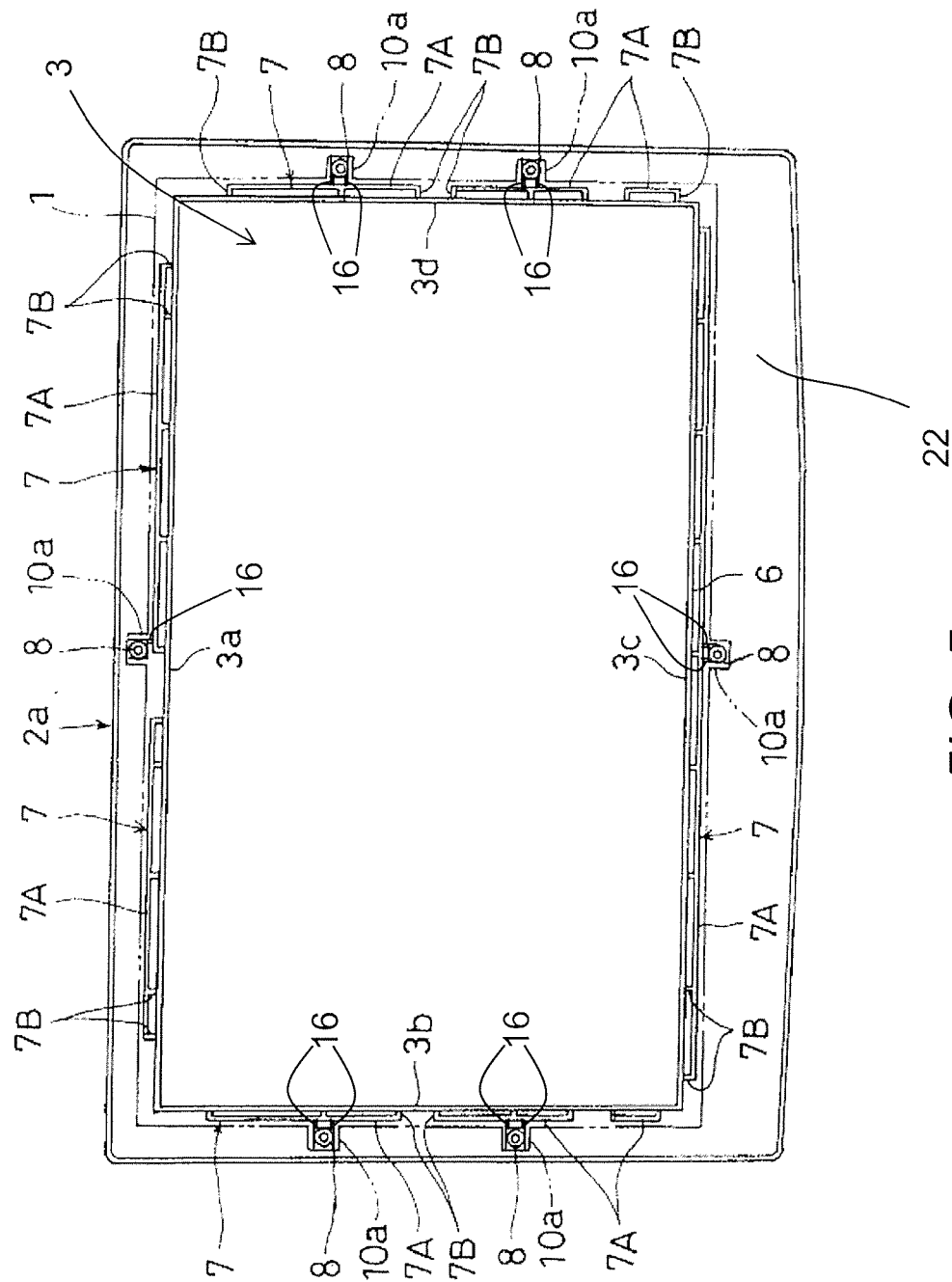
FIG. 5 is a rear elevational view of the front cabinet of the flat panel display device.
Figure 6:
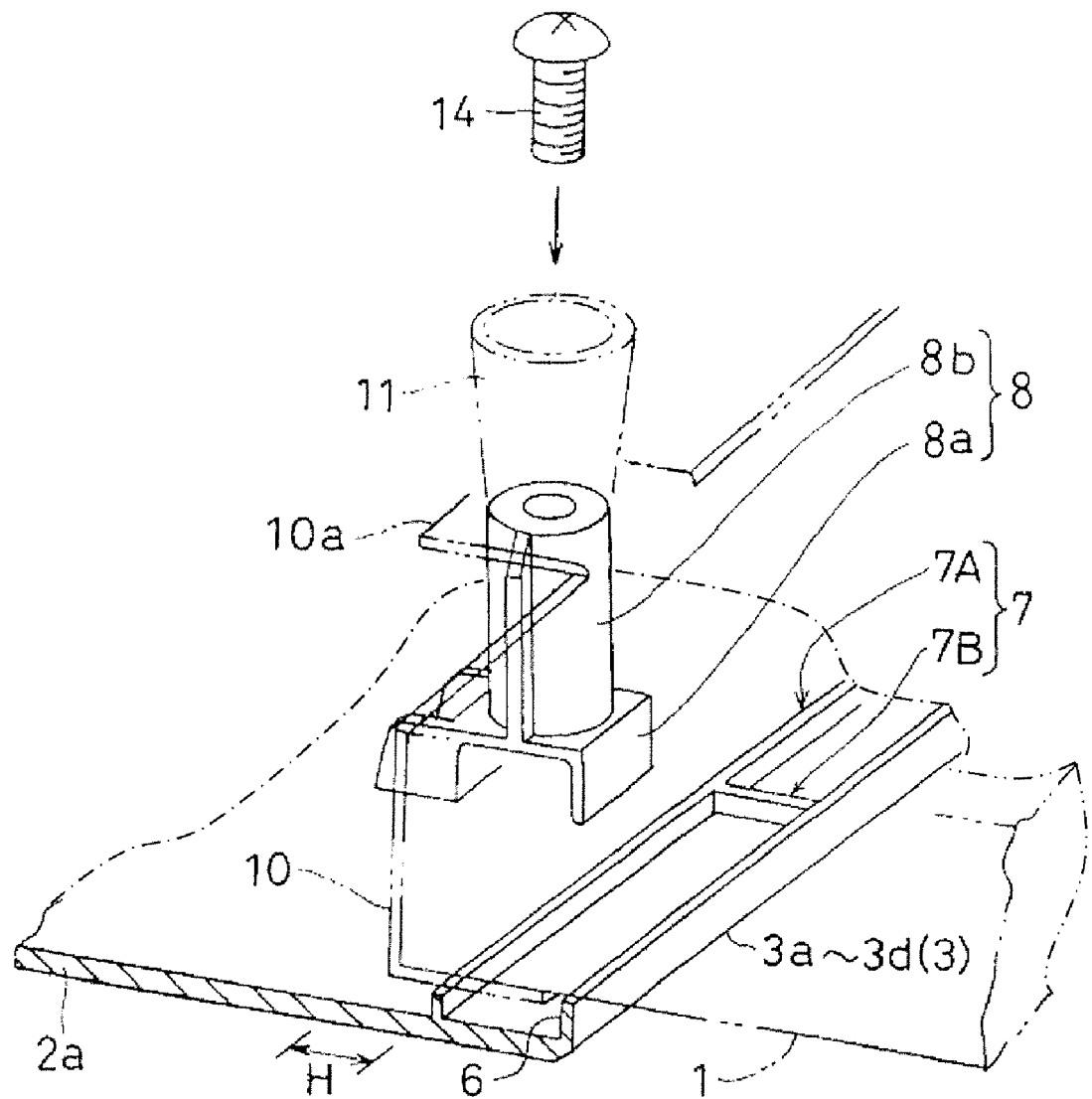
FIG. 6 is a detailed perspective view of a flat panel display device without reinforcing ribs.

FIGS. 1, 2A, 2B, 2C and 5 illustrate an assembly structure of the flat panel display device. FIG. 1 is a detailed perspective view of the flat panel display device. FIGS. 2A to 2C are detailed cross sectional views illustrating an assembly process of the flat panel display device. FIG. 5 is a rear elevational view of the front cabinet 2a.

As shown in FIGS. 1 and 5, the front cabinet 2a includes a rectangular edge frame (e.g., edge portion) 6, a plurality of contact ribs 7, and a plurality of bosses (e.g., first bosses) 8. The rectangular edge frame 6 is integrally formed surrounding the opening 3 on a rear face 22 of the front panel 21 of the front cabinet 2a. The rectangular edge frame 6 has four side parts that correspond to the sides 3a to 3d of the opening 3, respectively. The contact ribs 7 include a plurality of main ribs 7A and a plurality of sub-ribs (e.g., sub ribs) 7B, respectively. The main ribs 7A are formed in parallel to and near the rectangular edge frame 6. In particular, the main ribs 7A extend parallel to the sides 3a to 3d, respectively. The sub-ribs 7B link the main ribs 7A and the rectangular edge frame 6, respectively. In particular, the sub-ribs 7B extend between the main ribs 7A and the sides 3a to 3d of the opening 3, respectively. The sub-ribs 7B are integrally formed on the rear face 22 of the front cabinet 2a. The sub-ribs 7B extend perpendicular to the main ribs 7A and the rectangular edge frame 6 (i.e., sides 3a to 3d), respectively. The bosses 8 are integrally provided at specific intervals in a peripheral direction of the rectangular edge frame 6 to outside portions of the contact ribs 7 on the rear face 22 of the front cabinet 2a. In particular, the bosses 8 are formed on the rear face 22 of the front cabinet 2a at radial outward locations relative to the main ribs 7A of the contact ribs 7 with respect to a center of the opening 3. Each of the bosses 8 has a quadrilateral base frame part 8a and a boss main body (e.g., cylindrical body) 8b. The base frame part 8a is formed integrally on the rear face 22 of the front cabinet 2a. The boss main body 8b is provided integrally on a rear face of the base frame part 8a. The boss main body 8b includes a cylindrical portion with a screw hole 8c. The front cabinet 2a is integrally formed as one-piece, unitary member. The front and rear cabinets 2a and 2b are made of synthetic resin.

As shown in FIGS. 1 and 5, the front cabinet 2a further includes a plurality pairs of reinforcing ribs 16. The reinforcing ribs 16 link the contact ribs 7 with the base frame parts 8a of the bosses 8, respectively. The reinforcing ribs 16 are formed integrally with thin portions H of the rear face 22 of the front cabinet 2a. The reinforcing ribs 16 extend between the bosses 8 and the main ribs 7A of the contact ribs 7, respectively. The thin portions H are located between the contact ribs 7 and the bosses 8, respectively. The reinforcing ribs 16 include bezel-opposing faces (e.g., first top faces) 16a and substantially triangular corner reinforcing pieces 17, respectively. The bezel opposing faces 16a are formed in plane with bezel-contact faces (e.g., second top faces) 7a of the contact ribs 7. The corner reinforcing pieces 17 are formed integrally in corners that are formed between the reinforcing ribs 16 and the base frame parts 8a. In particular, the corner reinforcing pieces 17 have inclined top faces 17a that extend between the bezel-opposing faces 16a and side faces of the base frame parts 8a, respectively. Here, the inclined top faces 17a include a plane. However, the inclined top faces 17a can include a curved face. The rear cabinet 2b further includes a plurality of bosses (e.g., second bosses) 11. The bosses 11 are formed at locations corresponding to the bosses 8 of the front cabinet 2a. Each of the bosses 11 has a bottom plate with a screw insertion hole (e.g., second through hole) 12. The bosses 11 are integrally formed with the rear cabinet 2b. The rear cabinet 2b is fixedly coupled to the front cabinet 2a.

The bezel 10 includes a plurality of flanges (e.g., tab portions) 10a, a side wall 10b, and a front flange (e.g., front frame portion) 10c. The flanges 10a extends radial outward from a rear side end (e.g., rear end portion) of the side wall 10b, respectively, and are formed at locations corresponding to the bosses 8 so that the flanges 10a are opposite distal end faces of the bosses 8, respectively. Each of the flanges 10a has screw insertion holes (e.g., first through holes) 13. The flanges 10a are integrally formed with the side wall 10b. The side wall 10b is disposed about the liquid crystal panel with the cell face 1a so that the side wall 10b faces side faces of the liquid crystal panel. The front flange 10c extends radial inward from a front side end of the side wall 10b so that the front flange 10c faces a peripheral edge portion of the cell face 1a. The front flange 10c of the bezel 10 also contacts with the bezel-opposing faces 16a of the reinforcing ribs 16 and the bezel-contact faces 7a of the contact ribs 7.

Referring to FIGS. 2A, 2B, and 2C, the procedure for assembling the flat panel display device will be described. As shown in FIG. 2A, the liquid crystal module 1 contacts with the contact ribs 7 and the reinforcing ribs 16 via the bezel 10 around its outer periphery. In particular, the front flange 10c contacts with the contact ribs 7 and the reinforcing ribs 16. Then, the front flange 10c of the liquid crystal module 1 pushes the center parts of the sides 3a to 3d of the opening 3 down (e.g., frontward) by the distance β to the position indicated by the imaginary line K. As shown in FIG. 2B, the sides 3a to 3d are then put in a linear state so that the gap t between the opening 3 and the cell face 1a of the liquid crystal module 1 is even. The rectangular edge frame 6 has a first height measured in a normal direction of the cell face 1a between the distal end of the rectangular edge frame 6 and the front panel 21. The reinforcing ribs 16 have a second height measured in the normal direction between the bezel-opposing faces 16a and the front panel 21. The contact ribs 7 has a third height measured in the normal direction between the bezel-contact faces 7a and the front panel 21. The second height is equal to the third height. The gap 6 has a dimension measured in the normal direction that is equal to the difference between the thickness of the front flange 10c measured in the normal direction and the height difference between the first height and the second or third height.

Then, as shown in FIG. 2C, the front cabinet 2a is fitted together with the rear cabinet 2b, and the screws 14 are threaded into the screw holes 8c of the boss main bodies 8b of the bosses 8 of the front cabinet 2a through the screw insertion holes 13 of the flanges 10a and through the screw insertion holes 12 of the bosses 11 formed integrally on the rear cabinet 2b. As a result, the liquid crystal module 1 is integrally linked with the front cabinet 2a and the rear cabinet 2b.

Figure 7A:
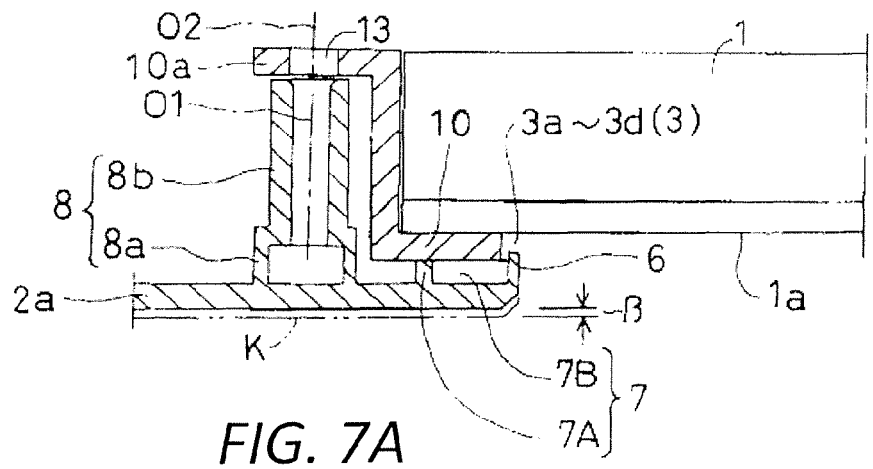
FIG. 7A is a detailed cross sectional view illustrating an assembly process of the flat panel display device without the reinforcing ribs.
Figure 7B:
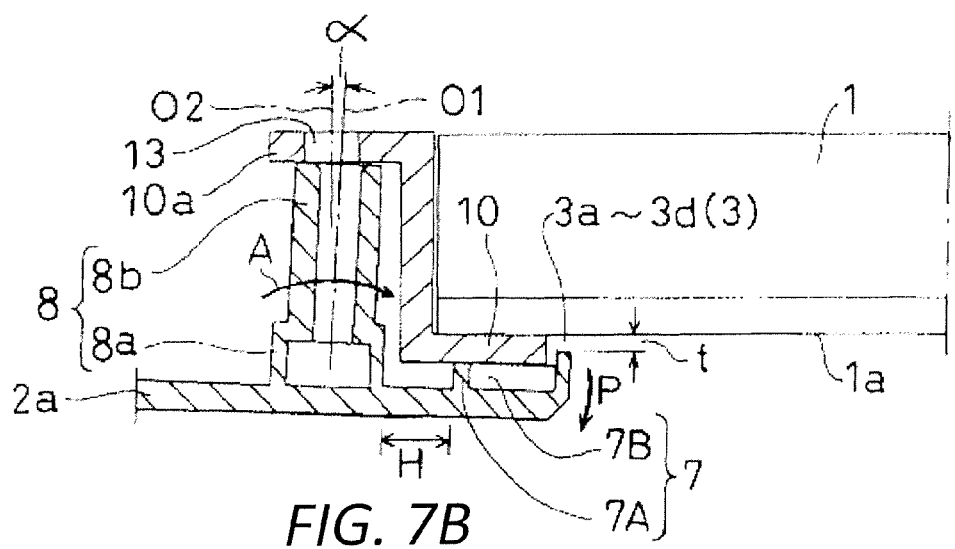
FIG. 7B is a detailed cross sectional view illustrating the assembly process of the flat panel display device without the reinforcing ribs.
Figure 7C:
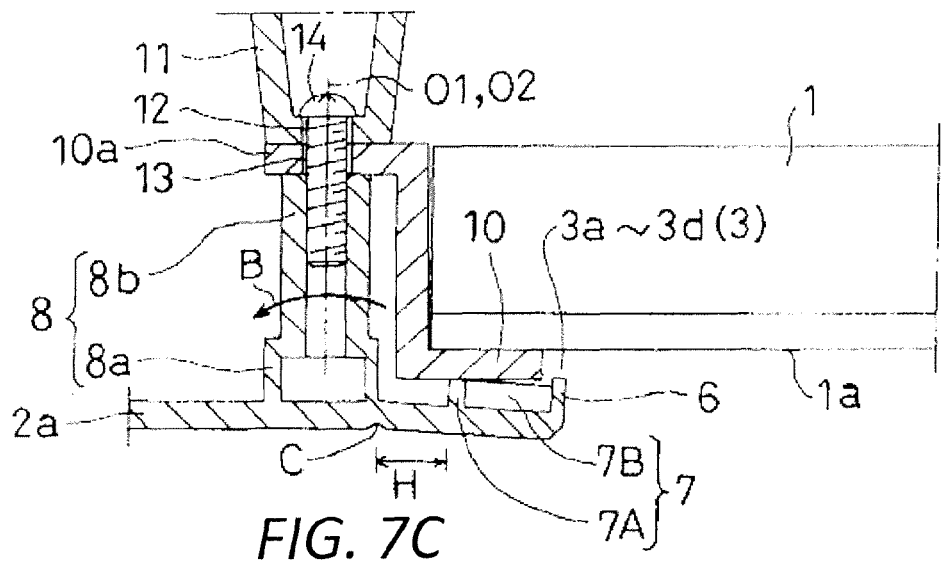
FIG. 7C is a detailed cross sectional view illustrating the assembly process of the flat panel display device without the reinforcing ribs.

Referring to FIGS. 6 and 7A to 7C, the effect of providing the reinforcing ribs 16 to the front cabinet 2a will be described. As shown in FIGS. 6 and 7A to 7C, if the reinforcing ribs 16 are not provided to the front cabinet 2a, there are thin portions H between the contact ribs 7 and the bosses 8 of the front cabinet 2a. When the liquid crystal module 1 contacts with the contact ribs 7, and the center parts of the sides 3a to 3d of the opening 3 are pushed down by the distance β with pressing force P (see FIGS. 7A and 7B), the thin portion H flexes under this pressing force P and inclines in an inward direction A indicated in FIG. 7B towards a center of the opening 3. Furthermore, center axes O1 of the bosses 8 also incline in the inward direction A. As a result, the center axes O1 of the bosses 8 become offset by an inclination angle α with respect to center axes O2 of the screw insertion holes 13 of the flanges 10a, respectively (see FIG. 7B). Furthermore, as shown in FIG. 7C, when the screws 14 are then threaded into the holes in the bosses 8, the bosses 8 are returned to their original state by the inclination angle α in the opposite direction (e.g., outward direction) B from the inward direction A. Therefore, bending stress produced by this return becomes concentrated between the thin portions H and the bosses 8. As a result, bending C occurs between the thin portions H and the bosses 8 on the surface of the front cabinet 2a. This mars the appearance of the front cabinet 2a.

On the other hand, with the flat panel display device, the thin portions H between the contact ribs 7 and the bosses 8 of the front cabinet 2a are reinforced by the reinforcing ribs 16 as illustrated in FIGS. 1, 2A to 2C, and 5. Thus, when the bezel 10 of the liquid crystal module 1 contacts with the contact ribs 7, and the center parts of the sides 3a to 3d of the opening 3 are pushed down, the thin portions H do not flex under this pressing force and cause the bosses 8 to incline. Rather, the center axes O1 of the bosses 8 coincides with the center axes O2 of the screw insertion holes 13 in the flanges 10a, respectively, and the bosses 8 stand straight up relative to the rear face 22 of the front cabinet 2a and the flanges 10a without being inclined. Thus, when the screws 14 are threaded into the holes in the bosses 8, bending stress does not become concentrated between the bosses 8 and the thin portions H. Therefore, bending C (see FIG. 7C for example) does not occur between the thin portions H and the bosses 8 on the surface of the front panel 22 of the front cabinet 2a. As a result, a neat appearance can be maintained for the front cabinet 2a.

Also, since the weight of the liquid crystal module 1 is distributed over the bezel-opposing faces 16a of the reinforcing ribs 16 and the bezel-contact faces 7a of the contact ribs 7, there is even less flexing of the thin portions H of the front cabinet 2a.

Furthermore, since the parts between the reinforcing ribs 16 and the bosses 8 are reinforced by the corner reinforcing pieces 17, the vertical orientation of the bosses 8 can be reliably maintained.

A liquid crystal television set is given as an example in the embodiment, but the application is not limited to this. The reinforcing ribs 16 of the front cabinet 2a can also be applied to a liquid crystal monitor or any of various other flat panel display devices.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a flat panel display device equipped with the present invention. Accordingly, these terms, as utilized to describe the present invention should be interpreted relative to a flat panel display device equipped with the present invention as used in the normal operating position.

While only a preferred embodiment has been chosen to illustrate the present invention, it will be apparent to those skilled in the art from these disclosures that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Furthermore, the foregoing descriptions of the preferred embodiment according to the present invention are provided for illustration only, and not for the purpose of limiting the invention as defined by the appended claims and their equivalents.

What is claimed is:

1. A flat panel display device comprising:
   a front cabinet including
      a front panel with a rectangular opening,
      an edge portion disposed on a rear face of the front panel along the rectangular opening,
      a plurality of contact ribs disposed on the rear face of the front panel along side parts of the edge portion, respectively, the contact ribs having a main rib that is arranged parallel to a respective one of the side parts of the edge portion, and a sub rib that extends between the main rib and the respective one of the side parts of the edge portion in a direction perpendicular to the main rib,
      a plurality of first bosses disposed on the rear face of the front panel at radial outward locations relative to the main ribs of the contact ribs with respect to a center of the rectangular opening, respectively, and
      a plurality of reinforcing ribs disposed on the rear face of the front panel, the reinforcing ribs extending between the first bosses and the main ribs of the contact ribs, respectively;
   a flat panel display component disposed within an inside space that is defined between the front and rear cabinets;
   a bezel fixedly coupled to an outer peripheral portion of the flat panel display component, the bezel having a front frame portion, a side wall portion and a plurality of tab portions, the front frame portion being disposed forward of the flat panel display device with respect to a front surface of the flat panel display component, the front frame portion contacting with the contact ribs, the side wall extending rearward of the flat panel display device with respect to the front frame portion, the tab portions extending outward of the flat panel display device with respect to the side wall from a rear end portion of the side wall the bezel such that the tab portions are opposite distal end faces of the first bosses of the front cabinet, respectively, the tab portions having a first through hole; and a plurality of screws disposed through the first through holes of the tab portions of the bezel and fastened to screw holes of the first bosses of the front cabinet.

2. The flat panel display device according to claim 1, further comprising a rear cabinet fixedly coupled to the front cabinet, the rear cabinet being disposed rearward of the flat panel display device with respect to the front cabinet, the rear cabinet including a plurality of second bosses, with the second bosses being disposed at locations corresponding to the first bosses of the front cabinet, the screws being disposed through second through holes of the second bosses of the rear cabinet and the first through holes of the tab portions of the bezel and fastened to screw holes of the first bosses of the front cabinet.

3. The flat panel display device according to claim 1, wherein the reinforcing ribs have a first top face, and the contact ribs have a second top face, the first and second top faces lying in a single plane, with the first and second top face contacting the front frame portion of the bezel.

4. The flat panel display device according to claim 3, wherein the front cabinet further includes a plurality of corner reinforcing pieces, with the corner reinforcing pieces being disposed at corner portions formed between the reinforcing ribs and the first bosses, respectively.

5. The flat panel display device according to claim 4, wherein the corner reinforcing pieces of the front cabinet have inclined top faces that extend between the reinforcing ribs and the first bosses, respectively.

6. The flat panel display device according to claim 5, wherein the first bosses of the front cabinet include a base frame part that is disposed on the rear face of the front panel, and a cylindrical body that is disposed on the base frame part and has the screw hole, and the reinforcing ribs of the front cabinet extend between the base frame parts of the first bosses and the main ribs of the contact ribs, respectively.

7. The flat panel display device according to claim 1, wherein the reinforcing ribs of the front cabinet include a pair of adjacent reinforcing ribs, the adjacent reinforcing ribs being arranged parallel to each other and spaced apart from each other in a direction of the front cabinet along one of the main ribs, one of the sub ribs being arranged parallel to the adjacent reinforcing ribs between the adjacent reinforcing ribs in the direction of the front cabinet.

8. The flat panel display device according to claim 1, wherein the side parts of the edge portion define edges of the rectangular opening of the front panel.

9. The flat panel display device according to claim 1, wherein the sub rib extends from the main rib to the respective one of the side parts of the edge portion perpendicular to both the main rib and the respective one of the side parts of the edge portion.

10. The flat panel display device according to claim 9, wherein the sub rib intersects both the main rib and the respective one of the side parts of the edge portion.

11. The flat panel display device according to claim 1, wherein the reinforcing ribs extend from the first bosses to the main ribs of the contact ribs perpendicular to the main ribs, respectively.

12. The flat panel display device according to claim 11, wherein the reinforcing ribs intersect both the first bosses and the main ribs, respectively.

13. The flat panel display device according to claim 1, wherein the front frame portion of the bezel is sandwiched between the front surface of the flat panel display component and the contact ribs of the front cabinet.

* * * * *